Patented Feb. 26, 1935

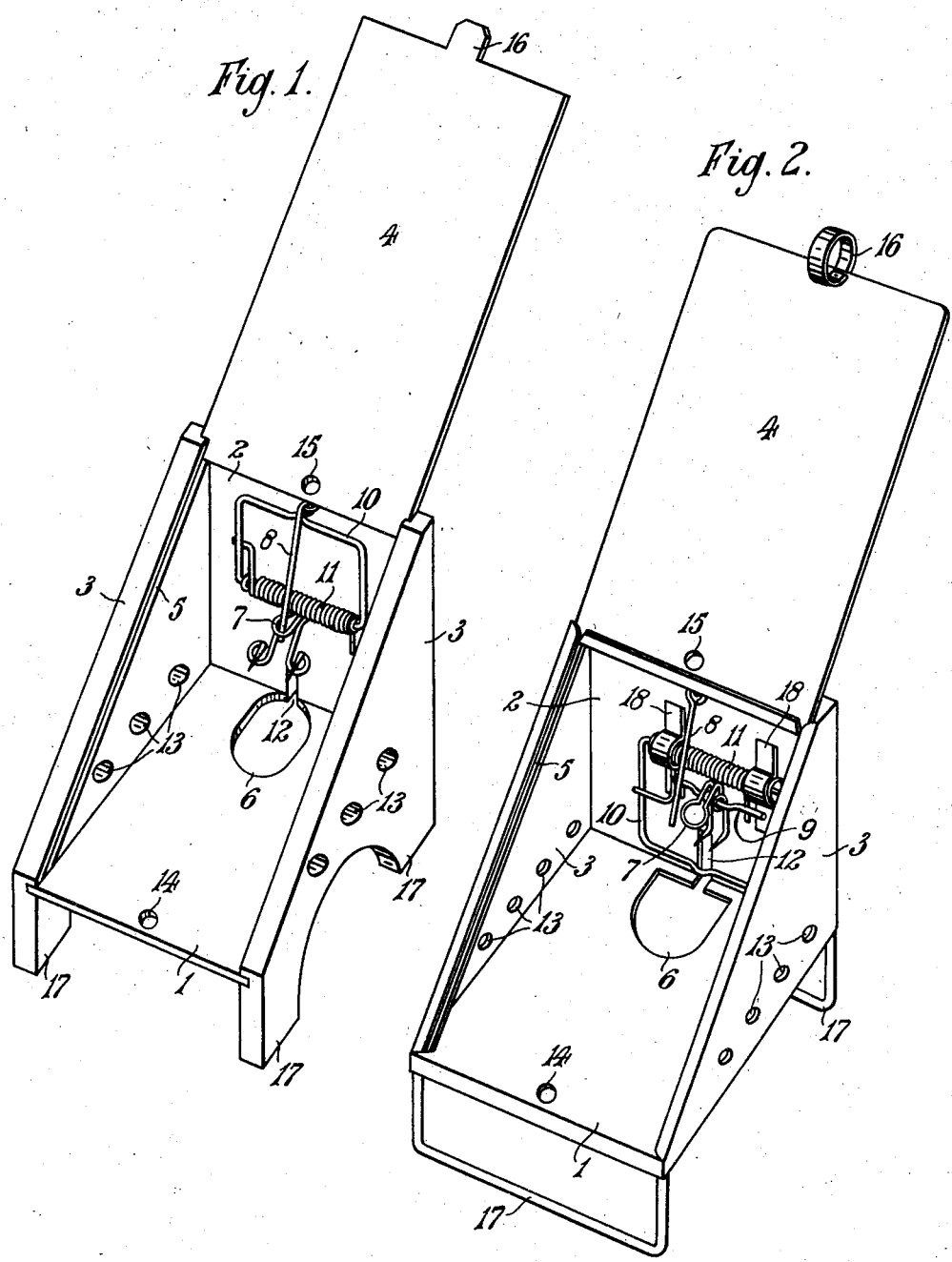

1,992,353

UNITED STATES PATENT OFFICE 1,992,353

VERMIN TRAP

Donald Cattanach, Kingussie, Scotland

Application September 26, 1934, Serial No. 745,639
In Great Britain September 30, 1933

5 Claims. (Cl. 43—81)

This invention relates to traps for vermin such for example as, rats, mice, stoats, weasels and the like, and has for its chief object to provide a simple, reliable and efficient apparatus, and one which will be sure and humane in operation. A further object of the invention is to provide an apparatus which will not be liable to cause injury, say to children, domestic animals, and fowls and to so construct the apparatus that the trapping device is only accessible to the vermin to be caught and to the person setting the trap.

According to the present invention the apparatus comprises an enclosing box or casing the floor of which is furnished with an opening through which the head alone or the head and neck of the vermin can enter to have access to the bait and the floor is raised above the ground level to permit of this access to the opening within the box. Above the opening in the floor thereof is a trapping or killing device comprising conveniently a bait-carrying trigger which, when touched by the animal, releases a striker which then sweeps or passes over the opening and strikes the head or neck of the vermin, traps and kills it.

Referring to the drawing:—

Fig. 1 is a perspective view of a trap embodying the present invention and showing the trap set, and Fig. 2 is a similar view of a modified embodiment and showing the trap released or sprung.

The reference numerals wherever repeated indicate the same or equivalent parts.

Referring to the embodiment illustrated in Fig. 1 and which may be conveniently constructed of wood, the apparatus comprises a box structure having a floor or base 1 which is preferably horizontal; a substantially vertical back wall 2; two approximately triangular side walls 3; and a sloping door or removable flap 4 adapted to slide in groove 5 in the side walls 3. The floor is raised from the ground level an appropriate distance, for the type of vermin to be trapped, so that said vermin can pass freely under the floor and push its head or head and neck through the opening 6 in the said floor.

In this embodiment, the floor is raised and supported above ground level by corner pieces or legs 17 which are conveniently formed in one with the side walls 3.

Above the animal-inlet opening 6 there is hinged or pivoted to the rear wall 2 a bait-carrying hook or trigger 7. This bait-carrying trigger is located at such a height above the opening 6 that the animal to be caught can just touch the bait and thus operate the trigger 7. The trigger, on being operated releases a latch or catch 8. This catch in the present embodiment, consists of a wire or bar pivotally supported on the rear wall 2 and passes over a spring controlled striker 10 which it holds in position against the action of a controlling spring 11. When this latch is released by the movement of the trigger, the striker, which is also mounted on the upright rear wall of the apparatus, for example by staples, is also released and sweeps down under the action of its controlling spring to pass over the opening in the floor thus violently striking the head or neck of the animal and killing it by such blow or by trapping it between the striker and the edge of the floor opening.

In the rear wall of the box, there is preferably provided at its lower end, a slot 12 to receive a portion of bait to aid in the attraction of the animal to the hole in the floor. Likewise holes 13 may be formed in the side walls of the box to permit the odour of the bait to escape and entice the vermin to the box.

The door or flap is raised as shown for baiting, and setting the trap, or for releasing a slain animal and re-baiting and resetting the trap. When the trap has been set, the door or flap is closed and may be secured in the closed position by a padlock, or catch passed through corresponding holes 14 and 15 in the end of box and the end of the flap respectively.

A lug or projection 16 is provided on the flap for facility in moving it.

In the embodiment shown in Fig. 2 the box is made of sheet metal. It is raised from the ground level by wire loops or bands 17. The spring controlled striker is conveniently carried in brackets 18 on the rear wall of the box and the bait-carrying trigger is pivotally carried on a bar 9 secured to the rear wall.

In operation in either example, after the trap has been baited, set and the door or flap closed and secured, the only access thereto is by the hole in the raised floor to which opening the animal is attracted by the bait on the trigger. When the animal inserts its head and pulls the bait, the trigger will be moved to release the catch and allow the striker to act. The animal will be struck and caught in a suspended position, being instantly and humanely killed while tasting the bait.

What I claim is:—

1. In a vermin trap, the combination of an enclosing box, a floor therefor, having a bait-access opening, means for supporting the floor above ground level, a movable lid for the box, and a trapping device situated over the bait-access opening to be released and trap the animal when the latter pulls the bait.

2. In a vermin trap, the combination of an enclosing box, a floor therefor having a head-receiving opening, a striker adapted to sweep over the opening when released, a retaining catch for the striker, a bait-carrying trigger for the catch above the opening in the floor, and means supporting the box above the ground level.

3. In a vermin trap, the combination of an enclosing box, a floor provided with a head-receiving opening, supports raising the floor of the box above ground level, a spring-controlled striker arranged within the box and adapted when released to move over the opening in the floor of the box, a retaining catch for the striker, and a bait-carrying trigger for the retaining-catch arranged over the opening in the floor of the box.

4. In a vermin trap, the combination of an enclosing box, a floor provided with a head-receiving opening, a movable door for the box, supports raising the floor above ground level, a spring-controlled striker above the opening in the floor and adapted when released to pass over said opening, a retaining catch for the striker, and a bait-carrying trigger for the retaining-catch arranged within the box and above the opening in the floor thereof.

5. In a vermin-trap, the combination comprising a box, a floor provided with a head-receiving opening, a vertical rear wall for the box provided at its lower end with a slot, two approximately triangular side walls for the box provided with perforations, a sliding lid for the box, means for securing the lid in closed position, supports raising the floor of the box above ground level, a spring-controlled striker adapted when released to pass over the aforesaid opening in the floor, a retaining catch for the striker, and a bait-carrying trigger arranged above the opening in the floor.

DONALD CATTANACH.